United States Patent Office 3,547,517
Patented Dec. 15, 1970

3,547,517
ANTIMONY SULFIDE-BARIUM OXIDE GLASSES AND REFLEX LIGHT REFLECTOR
Charles Edwin Searight and John Robert Ryan, Jackson, Miss., and Ezra McLaurin Alexander, South Houston, Tex., assignors to Cataphote Corporation, Jackson, Miss., a corporation of Ohio
No Drawing. Continuation-in-part of application Ser. No. 303,923, Aug. 22, 1963. This application May 29, 1967, Ser. No. 642,162
Int. Cl. C03c 3/12; G02b 5/12
U.S. Cl. 350—105                                                6 Claims

ABSTRACT OF THE DISCLOSURE

Disclosed are glass compositions having high refractive indices. The glasses contain primarily antimony sulfide and barium oxide. In the form of glass beads, the glasses are useful retroreflective lenses.

---

This application is a continuation-in-part of our co-pending application Ser. No. 303,923 filed Aug. 22, 1963, and now abandoned.

This invention relates to glass compositions. More particularly, this invention is concerned with novel glass compositions having high refractive indices which, in the form of glass beads, form retroflective lens elements.

Retroreflective lens elements are used to focus incident light, such as light from automobile head lamps, onto a reflector at or near the rear surface of the elements for the purpose of illuminating traffic signs, and other objects, at night.

Glass beads are the usual lens elements used since they focus the light from a distant source to a point close to the back surface of the sphere. The light is concentrated on the face of a reflector and then is reflected or returned through the beads in a direction essentially parallel to the incoming light. Retroreflection of this type operates most efficiently if the light is focused at, or close to, the back surface of the spherical beads so as to strongly illuminate the smallest area, instead of a larger area more dimly.

In order to achieve focusing of the incident light to or about the back surface of the beads, it has been found necessary to have the beads made of glasses which have high indices of refraction such as at least above 1.5 usually above 1.75 and advisably above 2.0.

It is often necessary to cover the front surfaces of retroreflective beads in order to reduce loss of optical properties due to dirt pickup, leaching and loss of beads Organic binders of various types are used but they seriously impair the light-focusing efficiency of the beads. Most organic binders and transparent plastic materials have an index of refraction near 1.5 which is substantially lower than most retroreflective beads. If the beads are so covered, the effective index of the glasses is reduced to the value $N = n/n_0$ where $n$ is the index of refraction for the glass and $n_0$ is the index of refraction for the binder. Specifically, if the beads have an index of 1.9, and the binder an index of 1.5, the value N is 1.27. Such values are too low to achieve good focusing of axial and 45° rays. If an effective index of $N = 1.8$ is desired, the glass would need to have an actual index of $n = 1.8 \times 1.5 = 2.7$.

According to the present invention there are provided novel light transmissive glass compositions possessed of good chemical stability and physical durability and which possess high indices of refraction such as above 1.7 and up to about 3.2. Many of the novel glass compositions herewith provided have indices above 1.9 and even above 2.1. The glass compositions in the form of beads make highly efficient retroreflective lens elements for use on signs, even when covered with an organic binder or resin.

The glass compositions of this invention are the fusion products of barium oxide with an antimony sulfide, particularly the trisulfide or pentasulfide, with or without the further inclusion of one or more oxides and/or sulfides of sodium, potassium, lithium, calcium, boron, arsenic, bismuth, zinc, lead, titanium, strontium, cadmium, silicon, aluminum, magnesium, tin, tantalum, lanthanum, selenium and tellurium, or these elements with gaseous oxygen or elemental sulfur.

More specifically, these novel glass compositions of high refractive index are the fusion products of mixtures containing about 10 to 75% by weight barium oxide, 10 to 75% by weight of an antimony sulfide and from none to about 50% by weight of one or more supplemental oxides and/or sulfides of sodium, potassium, lithium, calcium, boron, arsenic, bismuth, zinc, lead, titanium, strontium, cadmium, silicon, aluminum, magnesium, tin, tantalum, lanthanum, selenium and tellurium. Generally from about 20 to 60% of each of an antimony sulfide and barium oxide are used in the glass compositions with the supplemental oxides and sulfides, if present at all, not exceeding 50%, and desirably not above 30%, by weight of the batch composition.

Of the supplemental oxides and sulfides which can be included with barium oxide and an antimony sulfide, it has been found that from about 1% to about 30% of an oxide and/or sulfide of tantalum, lanthanum, bismuth, silicon and aluminum contributes substantially to the chemical stability and structural durability of the glasses.

The fused reaction product of 25 to 75% by weight of barium oxide and 25 to 75% by weight of antimony trisulfide gives especially useful glasses, and particularly useful glasses contain the fused reaction product of 30 to 60% by weight of barium oxide and the balance 40 to 70% by weight of antimony trisulfide.

The production of these glasses can be readily achieved by intermixing barium oxide and an antimony sulfide, and so much of the supplemental oxides and/or sulfides as are to be included, and placing the mixture in a glass furnace. The various ingredients for the glass batch are advisably weighed and blended together in dry form and subsequently added to a heated glass furnace. The batch is then reduced to a fusion mixture at a fining temperature in the range of 800° F. to about 2500° F. Melting occurs rapidly for small batches and is often completed in 5–30 minutes. For larger batches from a few to many hours may be needed. The time and temperature used are well within the skill and experience of a man skilled in the glass art.

Due to the very volatile nature of some of the sulfide compounds of this invention, in some cases it is advisable to form the glass composition by melting the mixture of constituents under pressure. The pressure needed will vary from one composition to another but it is readily determined. Often it is adequate to simply place a ceramic lid or cover on a crucible containing the batch mixture to be fused together. The lid, with weighting if desired, prevents loss of all but a very small amount of material.

Another method which can be utilized in melting the glass compositions which are so volatile that compositional changes occur when they are melted under atmospheric pressure only, is to compensate for the loss by the use of additional quantities of the volatilizing ingredients, i.e., some of the sulfides and sulfur.

The resulting glass after fining can be withdrawn from the furnace and chilled, desirably in a fluid medium such as water or air. It can be subsequently comminuted to any particle sizes and formed into glass spheres or beads by passing the particles through a heated tube, a procedure well known in the art. Of course, glass beads can be formed directly from the molten glass after removal from the furnace. Alternatively, the molten glass from the furnace can be poured as a small stream into a blast of air to disperse it into small particles which, upon cooling, give glass beads of high refractive properties.

Instead of adding the oxides and sulfides to the furnace in such form, they can be formed in situ from oxide and sulfide producing materials. Thus, barium nitrate and barium carbonate can be charged to the furnace to be converted in situ to barium oxide. Also, at least some of the metals can be charged in elemental form and be converted in situ in the furnace by adding sulfur or oxygen thereto. In practicing this invention, it is not important in what form the materials are added or reacted so long as barium oxide and an antimony sulfide are provided, with such other oxides and/or sulfides as are appropriate, in the furnace for conversion into glass.

These glass compositions slightly flux furnace refractories as the batch is being melted and fined. The refractory thus may slightly contaminate the glass. Since contamination of this type lowers the index of refraction, care should be taken to select refractories which impart a minimum of contamination to the glass. The well known fused/cast refractories of the alumina and/or zirconia types work quite well in making the glasses of this invention.

A large number of glass compositions are produced according to this invention, including the glasses set forth in the following Tables 1 to 6. The glasses produced will have substantially the same elemental analysis as present in the batches before melting when care is taken to avoid loss of volatile constituents.

TABLE 1.—GLASS COMPOSITION PERCENTAGE BY WEIGHT

|  | 1 | 2 | 3 | 4 | 5 | 6 | 7 | 8 | 9 | 10 |
|---|---|---|---|---|---|---|---|---|---|---|
| BaO | 50 | 40 | 60 | 25 | 70 | 75 | 50 | 40 | 20 | 30 |
| $Sb_2S_3$ | 50 | 60 | 40 | 75 | 30 | 25 | 30 | 30 | 50 | 30 |
| BaS |  |  |  |  |  |  | 20 | 30 | 30 | 40 |

TABLE 2.—GLASS COMPOSITION PERCENTAGE BY WEIGHT

|  | 11 | 12 | 13 | 14 | 15 | 16 | 17 | 18 | 19 | 20 |
|---|---|---|---|---|---|---|---|---|---|---|
| BaO | 50 | 30 | 20 | 40 | 75 | 52.4 | 20 | 20 | 20 | 52.7 |
| $Sb_2S_3$ | 20 | 20 | 75 | 40 | 15 | 15 | 50 | 40 | 40 | 26.3 |
| BaS |  |  | 5 |  | 10 |  |  | 20 | 10 |  |
| ZnS | 30 | 50 |  | 20 |  | 36.2 | 30 | 20 | 30 | 19 |
| CaO |  |  |  |  |  |  |  |  |  | 2 |

TABLE 3.—GLASS COMPOSITION PERCENTAGE BY WEIGHT AND REFRACTIVE INDEX THEREFOR

|  | 21 | 22 | 23 | 24 | 25 |
|---|---|---|---|---|---|
| BaO | 50 | 30 | 40 | 45 | 45 |
| $Sb_2S_3$ | 30 | 50 | 50 | 50 | 45 |
| $K_2S$ | 20 | 20 | 10 | 5 | 10 |
| Refractive index | 1.98 | 2.00 | 2.08 | 2.24 | 2.12 |

TABLE 4.—GLASS COMPOSITION PERCENTAGE BY WEIGHT

|  | 26 | 27 | 28 | 29 | 30 | 31 |
|---|---|---|---|---|---|---|
| BaO | 30 | 35.4 | 36.4 | 37.5 | 30 | 20 |
| $Sb_2S_3$ | 50 | 40 | 40 | 30 | 50 | 50 |
| $K_2S$ | 4.4 | 4.9 |  | 5.5 |  |  |
| CaO | 5.6 | 6.2 | 11.3 | 7.0 | 10 | 20 |
| ZnO | 10 | 11.5 | 11.3 | 10 | 10 | 10 |
| $Al_2O_3$ |  | 2 | 1 |  |  |  |
| BaS |  |  |  |  | 10 |  |

TABLE 5.—GLASS COMPOSITION PERCENTAGE, BY WEIGHT

|  | 32 | 33 | 34 | 35 | 36 | 37 | 38 | 39 |
|---|---|---|---|---|---|---|---|---|
| BaO | 50 | 40 | 30 | 20 | 50 | 45 | 45 | 38 |
| $Sb_2S_3$ | 30 | 30 | 40 | 40 | 48 | 45 | 45 | 40 |
| ZnS | 18 | 20 | 18 | 20 |  |  |  | 5 |
| $SiO_2$ | 1 | 5 | 1 | 1 |  |  |  | 1 |
| $Al_2O_3$ | 1 | 5 | 1 | 1 |  |  |  | 1 |
| $TiO_2$ |  |  | 10 |  |  |  |  |  |
| CaO |  |  |  | 18 |  |  |  | 5 |
| PbS |  |  |  |  | 2 | 10 |  |  |
| PbO |  |  |  |  |  |  | 10 | 10 |

TABLE 6.—GLASS COMPOSITION PERCENTAGE, BY WEIGHT

|  | 40 | 41 | 42 | 43 | 44 | 45 |
|---|---|---|---|---|---|---|
| BaO | 30 | 44 | 48 | 30 | 10 | 40 |
| $Sb_2S_3$ | 40 | 50 | 50 | 50 | 50 | 30 |
| ZnS |  |  |  |  | 20 |  |
| $Al_2O_3$ |  | 3 | 1 |  |  |  |
| CaO |  |  |  |  | 10 |  |
| PbO |  |  |  |  | 10 |  |
| $Bi_2O_3$ |  |  | 30 |  |  |  |
| $Li_2O$ |  | 3 | 1 |  |  |  |
| ZnO |  |  |  |  | 10 |  |
| CaS |  |  |  |  | 10 |  |
| $As_2S_3$ |  |  |  |  |  | 20 |

These and other glasses of this invention are produced by melting a batch mixture as previously described and then quenching it rapidly in water to form glasses. Small glass beads can be produced from these glass compositions by suspending small particles of the glass in air at moderately high temperatures for a brief time and then quickly cooling or by using other techniques fully disclosed in the literature. The beads are weather-resistant and traffic-resistant.

The beads can be used in light reflectors by placing a layer of the light transmissive beads on an underlying light-reflecting means positioned in optical arrangement with the back extremities thereof so as to produce reflex reflection. A transparent binder coating can be used to apply the beads to the underlying light-reflecting means. A transparent coating can be applied over the beads to protect them against dirt and abrasion. Patent 2,713,286 shows means of coating and applying the beads to make reflectors.

In addition to beads, the glass compositions herewith provided can be used as electronic elements and as flakes for decorative purposes.

The following example is presented to further illustrate the invention.

EXAMPLE 1

The following materials were mixed together to form a batch:

Batch analysis
$Sb_2S_3$ _____ 44.33
$BaCO_3$ _____ 53.12
$K_2O$ _____ 1.54
$Na_2O$ _____ 0.72

Fifteen grams of the mixture was placed in an open crucible and heated in a furnace at a furnace temperature of 1400° F. for ten minutes. The molten batch was poured as a thin stream through a blast of hot air having a velocity close to the speed of sound. The stream of molten glass broke up into very small particles which upon cooling gave glass beads of about 75–300 microns in diameter. The analysis of the glass, as compared to the unfused batch mixture, was as follows, with the figures given being percentages by weight:

| Element | Batch mixture | Glass |
|---|---|---|
| Sb | 31.8 | 30.6 |
| Ba | 47.4 | 47.0 |
| K | 1.28 | 0.88 |
| S | 12.53 | 12.58 |
| Na | 0.54 | 0.73 |
| O | 6.45 | 8.21 |

The glass had an index of refraction of 2.1.

Various changes and modifications of the invention can be made and, to the extent that such variations incorporate the spirit of this invention, they are intended to be included within the scope of the appended claims.

What is claimed is:

1. A glass composition consisting essentially of the fused reaction product of 10 to 75% by weight of barium oxide, 10 to 75% by weight of antimony trisulfide or antimony pentasulfide, and as a supplementary material (A) up to 50% by weight of BaS, ZnS, $Bi_2O_3$, CaO, $As_2S_3$ or $K_2S$ or mixtures thereof or (B) up to 30% by weight of ZnO, CaS, $TiO_2$, PbS, PbO, $SiO_2$ or $Al_2O_3$ or mixtures thereof, or mixtures of (A) and (B) up to a maximum of 50% by weight of the glass composition.

2. A glass composition according to claim 1 in which the supplementary material does not exceed 30% by weight of the glass composition.

3. A glass composition according to claim 1 in which the barium oxide is 20 to 60% by weight, the antimony trisulfide is 20 to 60% by weight and the supplementary material is not more than 30% by weight of the fused reaction product.

4. A glass composition according to claim 1 in the form of small glass light transmissive beads.

5. A reflex light reflector consisting essentially of a light-returning layer of small light transmissive glass beads, internal light-reflecting means underlying said beads and positioned in optical connection with the back extremities thereof so as to produce reflex reflection, said beads comprising the fused reaction product of 30 to 60% by weight of barium oxide and the balance 40 to 70% by weight of antimony trisulfide.

6. A glass composition consisting of the fused reaction product of 25 to 75% by weight of barium oxide and 25 to 75% by weight of antimony trisulfide.

References Cited

UNITED STATES PATENTS

| | | | |
|---|---|---|---|
| 2,555,715 | 6/1951 | Tatum | 350—105 |
| 2,713,286 | 7/1955 | Taylor | 350—105 |
| 2,790,723 | 4/1957 | Stradley et al. | 106—47 |
| 2,979,382 | 4/1961 | Frerichs | 23—136 |
| 3,002,842 | 10/1961 | Kelly | 106—47 |

OTHER REFERENCES

Rawson—Inorganic Glass-Forming Systems, Academic Press, New York, 1967, pp. 271 and 280–282.

HELEN M. McCARTHY, Primary Examiner

U.S. Cl. X.R.

106—47, 52; 350—1